United States Patent
Yamada et al.

(10) Patent No.: US 10,815,377 B2
(45) Date of Patent: Oct. 27, 2020

(54) RESIN COMPOSITION, RESIN MOLDING, METHOD FOR MANUFACTURING PLATED RESIN MOLDING, AND METHOD FOR MANUFACTURING ANTENNA-EQUIPPED PORTABLE ELECTRONIC DEVICE PART

(71) Applicant: MITSUBISHI ENGINEERING-PLASTICS CORPORATION, Tokyo (JP)

(72) Inventors: Ryusuke Yamada, Hiratsuka (JP); Takahiro Takano, Hiratsuka (JP)

(73) Assignee: MITSUBISHI ENGINEERING-PLASTICS CORPORATION, Tokyo (JP)

( * ) Notice: Subject to any disclaimer, the term of this patent is extended or adjusted under 35 U.S.C. 154(b) by 325 days.

(21) Appl. No.: 15/766,221

(22) PCT Filed: Oct. 5, 2016

(86) PCT No.: PCT/JP2016/079604
§ 371 (c)(1),
(2) Date: Apr. 5, 2018

(87) PCT Pub. No.: WO2017/061460
PCT Pub. Date: Apr. 13, 2017

(65) Prior Publication Data
US 2018/0298190 A1   Oct. 18, 2018

(30) Foreign Application Priority Data
Oct. 8, 2015  (JP) ................. 2015-199929

(51) Int. Cl.
*C08L 77/06* (2006.01)
*C08K 3/22* (2006.01)
(Continued)

(52) U.S. Cl.
CPC ............. *C08L 77/06* (2013.01); *C08K 3/22* (2013.01); *C08K 3/2279* (2013.01);
(Continued)

(58) Field of Classification Search
CPC ........... C08L 77/06; C08L 2201/02; C08L 2203/204; C08K 3/22; C08K 3/2279;
(Continued)

(56) References Cited

U.S. PATENT DOCUMENTS

2014/0002311 A1  1/2014 Takano et al.
2014/0353543 A1  12/2014 Wu et al.
(Continued)

FOREIGN PATENT DOCUMENTS

CN  103443328 A  12/2013
CN  104583330 A   4/2015
(Continued)

OTHER PUBLICATIONS

Extended European Search Report dated May 10, 2019 for corresponding Application No. 16853614.2.
(Continued)

*Primary Examiner* — William K Cheung
(74) *Attorney, Agent, or Firm* — Birch, Stewart, Kolasch & Birch, LLP

(57) ABSTRACT

Provided is a resin molding that uses a resin composition capable of achieving high platability, while being imparted flame retardant by the halogen-containing flame retarder, a method for manufacturing a plated resin molding, and a method for manufacturing an antenna-equipped portable electronic device part. The resin composition comprises 100
(Continued)

parts by weight of a thermoplastic resin; 5 to 100 parts by weight of a halogen-containing flame retarder; and, 1 to 30 parts by weight of a laser direct structuring additive, wherein the laser direct structuring additive contains antimony, and; a content of an antimony-containing flame retarder auxiliary is 0.5 parts by weight or less per 100 parts by weight of the thermoplastic resin.

17 Claims, 1 Drawing Sheet

(51) Int. Cl.
| | | |
|---|---|---|
| C08K 7/14 | (2006.01) | |
| C08K 3/013 | (2018.01) | |
| C08K 3/016 | (2018.01) | |
| C08K 5/00 | (2006.01) | |
| C23C 18/20 | (2006.01) | |
| C23C 18/38 | (2006.01) | |
| H01Q 1/24 | (2006.01) | |

(52) U.S. Cl.
CPC .............. *C08K 5/0066* (2013.01); *C08K 7/14* (2013.01); *C08K 3/013* (2018.01); *C08K 3/016* (2018.01); *C08K 2003/2231* (2013.01); *C08L 2201/02* (2013.01); *C08L 2203/20* (2013.01); *C23C 18/204* (2013.01); *C23C 18/38* (2013.01); *H01Q 1/243* (2013.01)

(58) Field of Classification Search
CPC ........ C08K 5/0066; C08K 7/14; C08K 3/013; C08K 3/016; C08K 2003/2231; C23C 18/204; C23C 18/38; H01Q 1/243
USPC ...................................................... 428/457
See application file for complete search history.

(56) References Cited

U.S. PATENT DOCUMENTS

| 2015/0175803 A1* | 6/2015 | Stoppelmann ........... C08K 3/32 428/35.7 |
| --- | --- | --- |
| 2015/0210849 A1 | 7/2015 | Motegi et al. |
| 2015/0244066 A1 | 8/2015 | Takano et al. |
| 2015/0247243 A1 | 9/2015 | Takano et al. |

FOREIGN PATENT DOCUMENTS

| CN | 104619783 A | 5/2015 |
| --- | --- | --- |
| EP | 2 711 399 A1 | 3/2014 |
| JP | 2009-161748 A | 7/2009 |
| JP | 2009-275216 A | 11/2009 |
| JP | 2013-144767 A | 7/2013 |
| JP | 2014-58604 A | 4/2014 |
| JP | 2014-74161 A | 4/2014 |
| JP | 2015-25127 A | 2/2015 |
| JP | 2015-120908 A | 7/2015 |
| WO | WO 2011/076729 A1 | 6/2011 |
| WO | WO 2011/076730 A1 | 6/2011 |
| WO | WO 2011/095632 A1 | 8/2011 |
| WO | WO 2012/128219 A1 | 9/2012 |
| WO | WO 2014/042283 A1 | 3/2014 |
| WO | WO 2015-101596 A | 6/2015 |

OTHER PUBLICATIONS

European Office Action, dated Jan. 15, 2020, for corresponding European Application No. 16853614.2.
International Preliminary Report on Patentability and English translation of Written Opinion (PCT/IB/373 and PCT/ISA/237) dated Apr. 10, 2018, issued in PCT/JP2016/079604.
Chinese Office Action and Search Report dated Dec. 5, 2018, issued in corresponding Chinese Patent Application No. 201680058237.2, with English translation.
European Office Action for Application No. 16853614.2, dated Jul. 28, 2020.

* cited by examiner

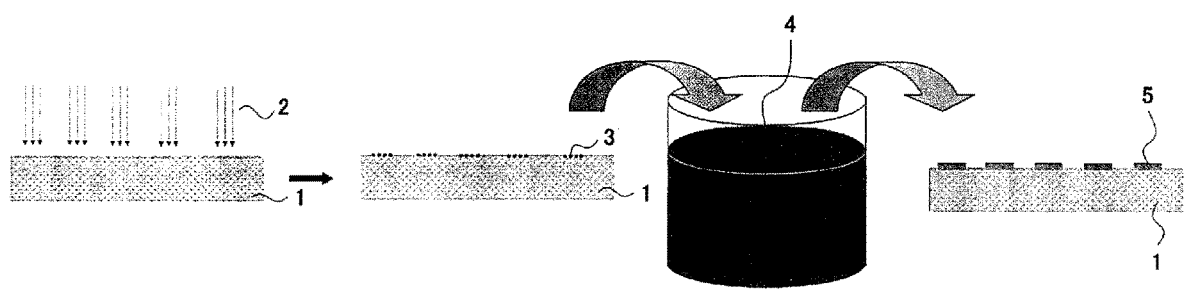

000
RESIN COMPOSITION, RESIN MOLDING, METHOD FOR MANUFACTURING PLATED RESIN MOLDING, AND METHOD FOR MANUFACTURING ANTENNA-EQUIPPED PORTABLE ELECTRONIC DEVICE PART

This international application is a Section 371 National Stage Application of International Application No. PCT/JP2016/079604, filed Oct. 5, 2016, which claims the benefit of Japanese Patent Application No. 2015-199929 filed on Oct. 8, 2015 with the Japan Patent Office, the entire disclosures of which are incorporated herein by reference.

TECHNICAL FIELD

This invention relates to a resin composition used for laser direct structuring, and further relates to a resin molding obtainable by molding the resin composition, a method for manufacturing a plated resin molding, and, a method for manufacturing an antenna-equipped portable electronic device part.

BACKGROUND ART

Keeping pace with development in mobile phones including smartphone, a variety of methods for fabricating antennas within the mobile phones have been investigated. In particular, there is a need for fabricating antennas with a three-dimensional design onto the mobile phones. Laser direct structuring (occasionally referred to as "LDS", hereinafter) technique has attracted public attention, as one known technique for fabricating such three-dimensional antenna. LDS is a technique for forming a plating layer, by irradiating laser on the surface of a resin molding that contains a LDS additive, to thereby activate only the irradiated area, and by applying a metal to the thus activated area. An advantage of the technique resides in capability of fabricating a metal structure such as antenna, directly onto the surface of a resin base, without using an adhesive or the like. The LDS technique is disclosed for example in Patent Literatures 1 to 4.

On the other hand, it has also been known to blend a flame retarder to a thermoplastic resin, to thereby improve the flame retardant. For example, Patent Literature 5 describes blending of a halogen-containing flame retarder or a phosphorus-containing flame retarder to a thermoplastic resin.

CITATION LIST

Patent Literature

[Patent Literature 1] WO2011/095632, pamphlet
[Patent Literature 2] WO2011/076729, pamphlet
[Patent Literature 3] WO2011/076730, pamphlet
[Patent Literature 4] WO2012/128219, pamphlet
[Patent Literature 5] JP-A-2009-161748

SUMMARY OF THE INVENTION

Technical Problem

Recent trend also requires the resin composition for LDS to be flame retarder. It is a common practice to blend a flame retarder to impart flame retardant. The present inventors, however, found from our investigations that the plating could not be formed on the resin composition that contains the halogen-containing flame retarder, such as that described in Patent Literature 5, even if the LDS additive was added.

This invention is aimed at solving the above-described problem, and is to provide a resin composition that excels in platability, while enjoying flame retardant ascribable to a halogen-containing flame retarder. It is another object of this invention to provide a method for manufacturing a resin molding using the resin composition, a method for manufacturing a plated resin molding, and a method for manufacturing an antenna-equipped portable electronic device part.

Solution to Problem

Aiming at addressing the problem, the present inventors conducted investigations to find that combined use of the halogen-containing flame retarder and an antimony-containing LDS additive successfully achieved a high level of flame retardant, even when the halogen-containing flame retarder was used, and could provide a resin composition with a high level of platability. Specifically, the above problems were solved by the following <1>, preferably <2> to <16>.

<1> A resin composition comprising: 100 parts by weight of a thermoplastic resin; 5 to 100 parts by weight of a halogen-containing flame retarder; and, 1 to 30 parts by weight of a laser direct structuring additive, wherein the laser direct structuring additive contains antimony, and; a content of an antimony-containing flame retarder auxiliary is 0.5 parts by weight or less per 100 parts by weight of the thermoplastic resin.

<2> The resin composition of <1>, further comprising 10 to 150 parts by weight of an inorganic filler per 100 parts by weight of the thermoplastic resin.

<3> The resin composition of <2>, wherein the inorganic filler is a glass fiber.

<4> The resin composition of any one of <1> to <3>, wherein a content of antimony in the resin composition is 0.1% by weight or more.

<5> The resin composition of any one of <1> to <4>, wherein the thermoplastic resin is a polyamide resin.

<6> The resin composition of any one of <1> to <5>, wherein the laser direct structuring additive contains antimony and tin, with a content of tin larger than a content of antimony.

<7> The resin composition of any one of <1> to <6>, wherein the laser direct structuring additive contains at least one of antimony oxide and tin oxide.

<8> The resin composition of any one of <1> to <7>, wherein the halogen-containing flame retarder contains a brominated polystyrene resin.

<9> The resin composition of any one of <1> to <8>, which satisfies V-0 in UL 94 test, when the resin composition is formed into a resin molding with an average thickness of 1.5 mm.

<10> A resin molding, obtainable by molding the resin composition described in any one of <1> to <9>.

<11> The resin molding of <10>, having a plating on a surface thereof.

<12> The resin molding of <11>, wherein the plating serves as an antenna.

<13> The resin molding of any one of <10> to <12>, which is a portable electronic device part.

<14> A method for manufacturing a plated resin molding comprising forming a plating by irradiating laser on a surface of a resin molding obtainable by molding the resin composition described in any one of <1> to <9>, and then by applying a metal.

<15> The method for manufacturing a plated resin molding of <14>, wherein the plating is a copper plating.

<16> A method for manufacturing an antenna-equipped portable electronic device part, comprising the method for manufacturing a plated resin molding described in <14> or <15>.

Advantageous Effects of Invention

According to this invention, it now became possible to provide a resin composition capable of achieving high platability, while being imparted flame retardant by the halogen-containing flame retarder. It now also became possible to provide a resin molding that uses the resin composition, a method for manufacturing a plated resin molding, and a method for manufacturing an antenna-equipped portable electronic device part.

BRIEF DESCRIPTION OF DRAWINGS

[FIGURE] A schematic drawing illustrating a step of providing a plating on the surface of a resin molding that uses the resin composition. In the FIGURE, numeral 1 stands for a resin molding, 2 for laser, 3 for an area irradiated by the laser, 4 for a plating solution, and 5 for a plating.

DESCRIPTION OF EMBODIMENTS

This invention will be detailed below. Note that all numerical ranges given in this specification, using "to" preceded and succeeded by numerals, are used to represent the ranges including these numerals respectively as the lower and upper limit values.

The resin composition of this invention is a resin composition that contains 100 parts by weight of a thermoplastic resin, 5 to 100 parts by weight of a halogen-containing flame retarder, and, 1 to 30 parts by weight of a laser direct structuring additive, wherein the laser direct structuring additive contains antimony, and, contains 0.5 parts by weight or less of an antimony-containing flame retarder auxiliary, per 100 parts by weight of the thermoplastic resin.

As described previously, the present inventors have found from our investigation that the plating could not be formed on the resin composition that contains the halogen-containing flame retarder, such as that described in Patent Literature 5, even if the LDS additive was added. From thorough examination on this point, the present inventors found that use of the antimony-containing flame retarder auxiliary per se gave rise to problem, when the halogen-containing flame retarder was used. That is, the halogen-containing flame retarder is hard to exhibit flame retardant when used alone, and is typically used in combination with the antimony-containing flame retarder auxiliary, but this flame retarder auxiliary was found to degrade the platability.

What is more surprising, the present inventors found that the plating layer could be formed by using the antimony-containing LDS additive as the LDS additive, rather than a copper chromium oxide as descried in Patent Literature 1, in combination with the halogen-containing flame retarder, and that the flame retardant of the halogen-containing flame retarder could be demonstrated even without being accompanied by the antimony-containing flame retarder auxiliary.

The findings led us to complete this invention. The resin composition of this invention may also be given good levels of various types of mechanical strength.

This invention will be detailed below.

<Thermoplastic Resin>

The resin composition of this invention contains a thermoplastic resin. Types of the thermoplastic resin are exemplified by, but not specifically limited to, polyamide resin, thermoplastic polyester resin, polyacetal resin, polylactate-based resin, polyolefin resin, polyphenylene sulfide resin, alloy of polyphenylene ether resin and polystyrene-based resin, alloy of polyphenylene ether resin and polyamide resin, methyl methacrylate/acrylonitrile/butadiene/styrene copolymer resin, methyl methacrylate/styrene copolymer resin, methyl methacrylate resin, and rubber-reinforced methyl methacrylate resin. In this invention, the composition preferably contains at least one species of polyamide resin, thermoplastic polyester resin or polyacetal resin, and more preferably contains at least one species of polyamide resin.

Preferred embodiments will be described below.

《Embodiment Containing Polyamide Resin as Major Component》

A first embodiment of the thermoplastic resin of this invention is exemplified by the case where the thermoplastic resin contains a polyamide resin. In this embodiment, the polyamide resin preferably accounts for 80% by weight or more of the entire resin component contained in the composition, which is more preferably 90% by weight or more, even more preferably 95% by weight or more, and particularly preferably 99% by weight or more. The upper limit of the content of polyamide resin relative to the entire resin component in this embodiment may be 100% by weight. Only one species, or two or more species of polyamide resins may be used. When two or more species are used, the total content preferably falls within the above-described ranges.

《<Polyamide Resin>》

The polyamide resin is a polymer whose repeating unit is an acid amide obtained by ring-opening polymerization of lactams, polycondensation of aminocarboxylic acids, or polycondensation of diamines and dibasic acids. Specific examples include polyamides 6, 11, 12, 46, 66, 610, 612, 6I, 6/66, 6T/6I, 6/6T, 66/6T, 66/6T/6I, polyamide MX, polytrimethylhexamethylene terephthalamide, polybis(4-aminocyclohexyl) methanedodecamide, polybis(3-methyl-4-aminocyclohexyl) methanedodecamide, and polyundecamethylene hexahydroterephthalamide. Note that "I" in the above stands for isophthalic acid component, and "T" for terephthalic acid component.

The polyamide resin used in this invention is suitably selected, considering various characteristics of the polyamide resin, and target applications of the moldings.

Among the above-described polyamide resins, preferable are semiaromatic polyamide whose starting dicarboxylic acid component has an aromatic ring, polyamide MX whose starting diamine component has an aromatic ring, and polyamide resin obtained by mixing them, since they can easily yield a compound with a relatively large content of inorganic filler for reinforcement. Specific examples of the semiaromatic polyamide include 6I, 6T/6I, 6/6T, 66/6T, and 66/6T/6I.

Meanwhile, the polyamide MX resin, obtained by polycondensing a xylylene diamine, whose diamine component has an aromatic ring, and an $\alpha,\omega$-dibasic acid, is preferable since a resin composition having a particularly high strength may be obtained. This is exemplified by a polyamide resin obtainable by polycondensing paraxylylene diamine and/or metaxylylene diamine, with a straight chain aliphatic α,ω-dibasic acid having 6 to 12 carbon atoms, or with an aromatic dibasic acid. Particularly preferable is a polyamide MX resin that uses sebacic acid and/or adipic acid as the dicarboxylic acid component.

Also mixtures of any of these aromatic ring-containing polyamide resins and an aliphatic polyamide resin may preferably be used. While the composition containing an aliphatic polyamide resin alone may occasionally have poor appearance or poor physical properties, mixing with such aromatic ring-containing polyamide resin will improve the appearance and physical properties.

The polyamide MX resin may be substituted by the aliphatic or semiaromatic polyamide resin up to 70% by weight (that is, it may be a polyamide resin containing 30% by weight or more of MX resin).

«Embodiment Containing Thermoplastic Polyester Resin as Major Component»

A second embodiment of the thermoplastic resin of this invention is exemplified by the case where the thermoplastic resin contains a thermoplastic polyester resin. In this embodiment, the thermoplastic polyester resin preferably accounts for 80% by weight or more of the entire resin component contained in the composition, which is more preferably 90% by weight or more, even more preferably 95% by weight or more, and particularly 99% by weight or more. The upper limit of the content of thermoplastic polyester resin relative to the entire resin component in this embodiment may be 100% by weight. Only one species, or two or more species of the thermoplastic polyester resins may be used. When two or more species are used, the total content preferably falls within the above-described ranges.

«<Thermoplastic Polyester Resin>»

As for the thermoplastic polyester resin, reference may be made to the description in paragraphs [0013] to [0016] of JP-A-2010-174223.

For the polyester resin, typically used is a mixture in which polybutylene terephthalate resin, or polybutylene terephthalate resin accounts for 60% by weight or more, and more preferably 80% by weight or more. For example, a mixture of polybutylene terephthalate resin and polyethylene terephthalate resin, with a content of the former of 60% by weight or more, and particularly 80% by weight or more, is one of preferred polyester resins employable in this invention. In such mixture of polybutylene terephthalate resin and polyethylene terephthalate resin, the content of polyethylene terephthalate resin is preferably 10 to 40% by weight, and more preferably 20 to 40% by weight.

As widely known, polybutylene terephthalate resin and polyethylene terephthalate resin have been mass-produced based on a reaction of terephthalic acid or its ester, with 1,4-butanediol or ethylene glycol, and marketed. In this invention, these commercially available resins may be used. While some of the commercially available resins might contain a copolymer component other than terephthalic acid component and 1,4-butanediol component or ethylene glycol component, those containing a small amount of such copolymer component, typically with a content of 10% by weight or less, and preferably 5% by weight or less, are employable in this invention.

The polybutylene terephthalate resin typically has an intrinsic viscosity of 0.5 to 1.5 dl/g, which is preferably 0.6 to 1.3 dl/g in particular. If smaller than 0.5 dl/g, the obtainable resin composition would tend to lower the mechanical strength. Meanwhile, if larger than 1.5 dl/g, the resin composition would have reduced fluidity, and degraded moldability as a consequence. The terminal carboxy group content is preferably 30 meq/g or less. The content of tetrahydrofuran, derived from 1,4-butanediol, is preferably 300 ppm or less.

The polyethylene terephthalate resin typically has an intrinsic viscosity of 0.4 to 1.0 dl/g, which is preferably 0.5 to 1.0 dl/g in particular. With an intrinsic viscosity of smaller than 0.4, the obtainable resin composition tends to have degraded mechanical characteristics, meanwhile with the intrinsic viscosity exceeding 1.0, the fluidity tends to degrade. Now all intrinsic viscosities discussed above are measured in a phenol/tetrachloroethane (1/1, ratio by weight) mixed solvent at 30° C.

«Embodiment Containing Polyacetal Resin as Major Component»

A third embodiment of the thermoplastic resin in this invention is exemplified by the case where the thermoplastic resin contains a polyacetal resin. In this embodiment, the polyacetal resin preferably accounts for 80% by weight or more of the entire resin component contained in the composition, which is more preferably 90% by weight or more, even more preferably 95% by weight or more, and particularly 99% by weight or more. The upper limit of the polyacetal resin content relative to the entire resin component in this embodiment may be 100% by weight. Only one species, or two or more species of the polyacetal resin may be used. When two or more species are used, the total content preferably falls within the above-described ranges.

«<Polyacetal Resin>»

As for polyacetal resin, references may be made to the descriptions in paragraph [0011] of JP-A-2003-003041, and paragraphs [0018] to [0020] of JP-A-2003-220667.

As for the polyphenylene sulfide resin, references may be made to the descriptions in paragraphs [0014] to [0016] of JP-A-H10-292114, paragraphs [0011] to [0013] of JP-A-H10-279800, and paragraphs [0011] to [0015] of JP-A-2009-30030.

The resin composition of this invention preferably has a content of resin component of 40% by weight or more relative to the entire composition, the resin component more preferably accounts for 50% by weight or more, and even more preferably accounts for 55% by weight or more. When blending the inorganic filler, the total of inorganic filler and the resin component preferably accounts for 60% by weight or more.

<LDS Additive>

The laser direct structuring additive (LDS additive) used in this invention contains antimony.

The LDS additive used in this invention is defined by a compound, which can form a plating layer on a laser-irradiated surface, when 4 parts by weight of such additive, supposed to be an LDS additive, was added to 100 parts by weight of PXD10 from Mitsubishi Gas Chemical Company, Inc. (PXD10 synthesized in EXAMPLES described later), the composition is irradiated by a 1064-nm YAG laser, at an output of 10 W, a frequency of 80 kHz, and a scanning speed of 3 m/s, and then subjected to electroless plating using M-Copper 85 plating bath from MacDermid, Inc. so as to apply a metal. If the resin, having the additive added thereto, is less susceptible to YAG laser and cannot be burnt to a suitable degree, the evaluation may be made after adding 10 to 40 parts by weight of titanium oxide to assist laser burning.

The LDS additive used in this invention may be a synthetic one or may be a commercially available one. The commercially available one is not always necessarily the one sold as the LDS additive, but also may be the one sold for other purposes, so long as it satisfies essential features of the LDS additive in this invention. Although many of known LDS additives have been black, the LDS additives employable in this invention are widely selectable also from non-black ones, making it possible to add colors to the resin molding.

The LDS additive used in this invention contains antimony; preferably contains antimony and tin; and more preferably contains antimony and tin, with the content of tin larger than the content of antimony. The LDS additive used in this invention preferably contains at least one of antimony oxide or tin oxide, and more preferably contains both of antimony oxide and tin oxide.

In the LDS additive used in this invention, the ratio by weight of antimony and tin is preferably 1:99 to 50:50, and more preferably 2:98 to 40:60.

As the LDS additive employable in this invention, preferable are antimony-doped tin, antimony-doped tin oxide, antimony oxide-doped tin oxide.

The LDS additive preferably has a weight-average particle size of 0.01 to 50 μm, which is more preferably 0.05 to 30 μm. With such design, the plating, when applied, will tend to have improved uniformity of surface profile.

The addition amount of LDS additive to the resin composition of this invention is 1 to 30 parts by weight, per 100 parts by weight of the thermoplastic resin. The lower limit value of the addition amount of LDS additive is preferably 5 parts by weight or above, relative to 100 parts by weight of the thermoplastic resin, which is more preferably 8 parts by weight or more. The upper limit value of the addition amount of LDS additive is preferably 28 parts by weight or below, per 100 parts by weight of the thermoplastic resin.

Only one species, or two or more species of the LDS additives may be used. When two or more species are used, the total content preferably falls within the above-described ranges.

The resin composition of this invention may be designed to contain substantially no other LDS additive other than the antimony-containing LDS additive. Now "to contain substantially no . . . " means, for example, that the addition amount of such other LDS additive is 5% by weight or less of the antimony-containing LDS additive, and more strictly 1% by weight or less.

In the resin composition of this invention, the ratio by weight of the LDS additive and the halogen-containing flame retarder (LDS additive/halogen-containing flame retarder) is preferably 0.01 to 5, more preferably 0.05 to 4, even more preferably 0.1 to 3, yet more preferably 0.1 to 0.9, and may also be 0.2 to 0.9, and further may be 0.2 to 0.8. Within these ranges, both of the platability and flame retardant may be improved more effectively in a well-balanced manner.

<Halogen-Containing Flame Retarder>

The resin composition of this invention contains a halogen-containing flame retarder. Preferred halogen-containing flame retarder is specifically exemplified by bromine-containing flame retarder, which include brominated polycarbonate, brominated epoxy resin, brominated phenoxy resin, brominated polyphenylene ether resin, brominated polystyrene resin, brominated bisphenol A, glycidyl brominated bisphenol A, pentabromobenzyl polyacrylate, and brominated imide. Brominated polystyrene resin is more preferable.

Specific examples of these compounds include low-molecular organobromine compounds such as hexabromobenzene, pentabromotoluene, hexabromobiphenyl, decabromobiphenyl, hexabromocyclododecane, decabromodiphenyl ether, octabromodiphenyl ether, hexabromodiphenyl ether, bis(pentabromophenoxy)ethane, ethylenebis(tetrabromophthalimide), and tetrabromobisphenol A; brominated polystyrene (for example, polymer or oligomer prepared by polymerizing brominated styrene, or by brominating polystyrene); brominated polycarbonate (for example, polymer or oligomer prepared typically by polymerizing brominated bisphenol A with carbonate precursor); brominated epoxy compound and/or brominated phenoxy compound (for example, diepoxy compound prepared typically by reacting brominated bisphenol A with epichlorohydrin, brominated epoxy oligomer, brominated epoxy polymer, brominated phenoxy polymer, and products of these substances having either one or both terminals have been blocked); and brominated polymers and oligomers such as brominated polyphenylene ether, polybrominated benzyl acrylate, and brominated bisphenol A/cyanuric chloride/brominated phenol condensate.

The addition amount of the halogen-containing flame retarder is preferably 5 to 100 parts by weight, per 100 parts by weight of the thermoplastic resin. The lower limit value of the addition amount is preferably 10 parts by weight or above, per 100 parts by weight of the thermoplastic resin, more preferably 20 parts by weight or above, even more preferably 25 parts by weight or above, and yet more preferably 30 parts by weight or above. The lower limit value of the addition amount is preferably 80 parts by weight or below per 100 parts by weight of the thermoplastic resin, more preferably 60 parts by weight or below, even more preferably 50 parts by weight or below, and yet more preferably 45 parts by weight or below.

Only one species, or two or more species of the halogen-containing flame retarders may be used. When two or more species are used, the total content preferably falls within the above-described ranges.

«Other Flame Retarder»

In this invention, any other flame retarder other than those described above may be used. Such other flame retarder is exemplified by phosphorus-containing flame retarder, and silicone-based flame retarder.

<Flame Retarder Auxiliary>

In the resin composition of this invention, the addition amount of an antimony-containing flame retarder auxiliary, per 100 parts by weight of the thermoplastic resin, is 0.5 parts by weight or less. The antimony-containing flame retarder auxiliary is used in combination with the halogen-containing flame retarder typically for assisting flame retardant thereof. In this invention, as a result of presence of the antimony-containing LDS additive, the composition can exhibit a high level of flame retardant, only with 0.5 parts by weight or less of the antimony-containing flame retarder auxiliary, per 100 parts by weight of the thermoplastic resin. In addition, although the antimony-containing flame retarder auxiliary has conventionally degraded the platability, the resin composition of this invention can achieve good platability, since the addition amount of the antimony-containing flame retarder auxiliary is controlled to 0.5 parts by weight per 100 parts by weight of the thermoplastic resin.

In the resin composition of this invention, the addition amount of the antimony-containing flame retarder auxiliary, per 100 parts by weight of the thermoplastic resin, is preferably 0.4 parts by weight or less, more preferably 0.3 parts by weight or less, even more preferably 0.2 parts by weight or less, yet more preferably 0.1 parts by weight or less, and even may be 0 parts by weight.

The antimony-containing flame retarder auxiliary is exemplified by antimony oxides such as antimony trioxide, antimony tetraoxide, and antimony pentaoxide; sodium antimonate; and antimony phosphate.

<Content of Antimony in Resin Composition>

The resin composition of this invention preferably has a content of antimony in the resin composition of 0.1% by weight or more, which is more preferably 0.2% by weight or more, and even more preferably 0.3% by weight or more. The upper limit value may be, but not specifically limited to, 2% by weight or below for example, which is more preferably 1.8% by weight or below, even more preferably 1.0% by weight or below, and yet more preferably 0.9% by weight or below. Within these ranges, the effects of this invention will more effectively be demonstrated.

In particular, with the antimony content in the composition controlled to 0.2% by weight or more, and preferably 0.2 to 1.0% by weight, and, with the ratio by weight of the LDS additive and the flame retarder (LDS additive/flame retarder) controlled to 0.2 or larger, the obtainable composition will have particularly excellent flame retardant and platability. The lower limit value of the ratio by weight of the LDS additive and the flame retarder (LDS additive/flame retarder) is preferably 0.3 or above. The upper limit value of the ratio by weight of the LDS additive and the flame retarder (LDS additive/flame retarder) is preferably 2.0 or below, more preferably 1.8 or below, and even may be 0.9 or below.

<Inorganic Filler>

The thermoplastic resin composition of this invention may contain an inorganic filler. The inorganic filler is exemplified by carbon fiber and glass fiber. Glass fiber is preferable.

The glass fiber is preferably at least the one selected from chopped strand, milled fiber, flake, bead and balloon, and is more preferably any of chopped fiber, milled fiber and flake.

The chopped strand is one form of glass fiber chopped into 1 to 10 mm in length, meanwhile the milled fiber is one form of glass fiber milled into approximately 10 to 500 µm in length. The glass fiber is marketed by Nippon Electric Glass Co., Ltd., which is readily available.

The glass flake is a flaky article with a thickness of 1 to 20 µm and a length of each side of 0.05 to 1.0 mm. This is, for example, marketed by Nippon Sheet Glass Co., Ltd. under the trade name "Fleka", which is readily available.

The glass bead is a spherical article with an outer diameter of 10 to 100 µm. This is, for example, marketed by Toshiba-Ballotini Co., Ltd. under the trade name "EGB731", which is readily available.

The balloon is a hollow glass bead. This is, for example, marketed by Tokai Kogyo Co., Ltd. under the trade name "PZ6000", which is readily available.

The raw glass is preferably non-alkaline, and is exemplified by E-glass, C-glass, S-glass, and R-glass. In this invention, E-glass is preferably used.

The inorganic filler may be surface-treated with a silane coupling agent such as (γ-methacryloxypropyl)trimethoxysilane, (γ-glycidoxypropyl)trimethoxysilane, and (γ-aminopropyl)triethoxysilane. The amount of adhesion thereof is typically 0.01 to 1% by weight, relative to the weight of inorganic filler. It is further possible to optionally use lubricants such as fatty acid amide compound and silicone oil; antistatic agents such as quaternary ammonium salt; film-forming resins such as epoxy resin and urethane resin; and mixtures of the film-forming resins, with heat stabilizer, flame retarder and so forth.

In the resin composition of this invention, the addition amount of inorganic filler is preferably 10 to 150 parts by weight, per 100 parts by weight of the thermoplastic resin, which is more preferably 15 to 90 parts by weight, even more preferably 20 to 80 parts by weight, and yet more preferably 40 to 80 parts by weight.

In the resin composition of this invention, the thermoplastic resin and the inorganic filler usually account for 70% by weight or more of the entire component.

Only one species, or two or more species of the inorganic fillers may be used. When two or more species are used, the total content preferably falls within the above-described ranges.

<Other Additives>

The resin composition of this invention may further contain various additives, without damaging the effects of this invention. Such additives are exemplified by mold releasing agent, talc, titanium oxide, heat stabilizer, light stabilizer, alkali, antioxidant, UV absorber, flame retarder, dye and pigment, fluorescent brightener, anti-dripping agent, antistatic agent, anti-clouding agent, lubricant, anti-blocking agent, flow modifier, plasticizer, dispersant, and antibacterial agent.

Only one of these additives may be used independently, or two or more additives may be used in combination.

«Mold Releasing Agent»

The resin composition of this invention may contain a mold releasing agent.

The mold releasing agent is exemplified by aliphatic carboxylic acid, ester formed between aliphatic carboxylic acid and alcohol, aliphatic hydrocarbon compound having a number-average molecular weight of 200 to 15,000, and polysiloxane-based silicone oil.

The aliphatic carboxylic acid is exemplified by saturated or unsaturated, aliphatic, monovalent or divalent or trivalent carboxylic acids. Now the aliphatic carboxylic acids encompass alicyclic carboxylic acids. Among these aliphatic carboxylic acids, preferable is monovalent or divalent carboxylic acid having 6 to 36 carbon atoms, and more preferable is aliphatic saturated monovalent carboxylic acid having 6 to 36 carbon atoms. Specific examples of such aliphatic carboxylic acid include palmitic acid, stearic acid, caproic acid, capric acid, lauric acid, arachic acid, behenic acid, lignoceric acid, cerotic acid, melissic acid, tetrariacontanic acid, montanic acid, adipic acid, and azelaic acid.

The aliphatic carboxylic acid, used in the ester formed between aliphatic carboxylic acid and alcohol, may be same as the aliphatic carboxylic acid described previously. Meanwhile, the alcohol is exemplified by saturated or unsaturated, monohydric or polyhydric alcohols. These alcohols may have a substituent such as fluorine atom or aryl group. Among them, preferable is monohydric or polyhydric, saturated alcohol having 30 or less carbon atoms, and more preferable is aliphatic or alicyclic, saturated monohydric alcohol, or aliphatic saturated polyhydric alcohol having 30 or less carbon atoms.

Specific examples of such alcohols include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol.

Specific examples of the ester formed between aliphatic carboxylic acid and alcohol include beeswax (mixture mainly composed of myricyl palmitate), stearylstearate, behenylbehenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, and pentaerythritol tetrastearate.

The aliphatic hydrocarbon having a number-average molecular weight of 200 to 15,000 is exemplified by liquid paraffin, paraffin wax, microwax, polyethylene wax, Fischer-Tropsch wax, and α-olefin oligomer having 3 to 12 carbon atoms. Now the aliphatic hydrocarbon encompasses alicyclic hydrocarbon. The aliphatic hydrocarbon preferably has a number-average molecular weight of 5,000 or smaller.

Among them, preferable are paraffin wax, polyethylene wax or partially oxidized polyethylene wax, and more preferable are paraffin wax and polyethylene wax.

The content of the mold releasing agent is preferably 0.001 to 3 parts by weight, per 100 parts by weight in total of the thermoplastic resin and the inorganic filler, which is more preferably 0.01 to 2 parts by weight. With the content of the mold releasing agent controlled to 0.001 parts by weight or more, the effect of mold releasing property will more efficiently be demonstrated, meanwhile with the content controlled to 3 parts by weight or less, the hydrolysis resistance will be improved, and thereby pollution of dies during injection molding will effectively be suppressed.

«Talc»

The resin composition of this invention may contain talc. With the talc contained therein, the laser-irradiated area will tend to have improved platability.

The addition amount of talc in the resin composition of this invention is preferably 0.1 to 50 parts by weight, per 100 parts by weight of the resin composition, which is more preferably 0.5 to 25 parts by weight, even more preferably 1 to 20 parts by weight, and yet more preferably 7 to 15 parts by weight.

«Titanium Oxide»

The resin composition of this invention may contain titanium oxide.

Titanium oxide employable in this invention is exemplified by titanium monoxide (TiO), dititanium trioxide ($Ti_2O_3$), and titanium dioxide ($TiO_2$). While any of them may be used, titanium dioxide is preferable. Among the titanium oxides, the one having a rutile-type structure is preferably used.

Titanium oxide preferably has a weight-average primary particle size of 1 μm or smaller, which more preferably falls in the range from 0.001 to 0.5 μm, and more preferably falls in the range from 0.002 to 0.1 μm. With the average particle size of titanium oxide controlled within these ranges, and with the addition amount controlled within the above-described ranges, the obtainable resin composition can give a molding with high levels of whiteness and surface reflectivity.

Titanium oxide employable here may be surface-treated. Surface treatment agent is preferably an inorganic and/or organic material. Specific examples include metal oxides such as silica, alumina and zinc oxide; and organic materials such as silane coupling agent, titanium coupling agent, organic acid, polyol and silicone.

Titanium oxide employable here may be any of commercially available ones. Those in the form of lump or having large average particle size may suitably be ground, and optionally classified through a mesh, so as to be adjusted to the above-described average particle size.

When titanium oxide is used, the addition amount thereof in the resin composition of this invention is preferably 30 to 150 parts by weight, per 100 parts by weight of the thermoplastic resin. Only one species, or two or more species of titanium oxides may be used. When two or more species are used, the total content falls within the above-described ranges.

«Heat Stabilizer»

The resin composition of this invention may further contain an organic and/or inorganic heat stabilizer, and more preferably contain an organic heat stabilizer.

The heat stabilizer used in this invention preferably contains substantially no copper. Now "substantially" means "below the detection limit". By limiting the copper content to such low level, it now becomes possible to suppress discoloration.

The organic heat stabilizer is preferably at least one species selected from the group consisting of phenol-based compound, phosphite-based compound, hindered amine-based compound, triazine-based compound, and sulfur-containing compound.

Only one species of heat stabilizer may be used, or two or more species may be combined.

The phenol-based compound is exemplified by, but not specifically limited to, hindered phenol-based compound. The hindered phenol-based compound is exemplified by N,N'-hexane-1,6-diylbis[3-(3,5-di-t-butyl-4-hydroxyphenylpropionamide)], pentaerythrityltetrakis[3-(3,5-di-t-butyl-4-hydroxyphenyl)propionate], N,N'-hexamethylenebis(3,5-di-t-butyl-4-hydroxy-hydrocinnamamide), triethylene glycol-bis[3-(3-t-butyl-5-methyl-4-hydroxyphenyl)propionate], 3,9-bis{2-[3-(3-t-butyl-4-hydroxy-5-methylphenyl)propinyloxy]-1,1-dimethylethyl}-2,4,8,10-tetraoxaspiro[5.5]undecane, 3,5-di-t-butyl-4-hydroxybenzylphosphonate diethyl ester, 1,3,5-trimethyl-2,4,6-tris(3,5-di-t-butyl-4-hydroxybenzyl)benzene, and 1,3,5-tris(4-t-butyl-3-hydroxy-2,6-dimethylbenzyl) isocyanurate.

The phosphite-based compound is exemplified by, but not specifically limited to, trioctyl phosphite, trilauryl phosphite, tridecyl phosphite, octyldiphenyl phosphite, trisisodecyl phosphite, phenyldiisodecyl phosphite, phenyldi(tridecyl) phosphite, diphenylisooctyl phosphite, diphenylisodecyl phosphite, diphenyl(tridecyl) phosphite, triphenyl phosphite, tris(nonylphenyl)phosphite, tris(2,4-di-t-butylphenyl) phosphite, tris(2,4-di-t-butyl-5-methylphenyl) phosphite, tris(butoxyethyl) phosphite, 4,4'-butylidene-bis(3-methyl-6-t-butylphenyl-tetra-tridecyl) diphosphite, tetra(C12 to C15 mixed alkyl)-4,4'-isopropylidenediphenyl diphosphite, 4,4'-isopropylidenebis(2-t-butylphenyl)-di(nonylphenyl) phosphite, tris(biphenyl) phosphite, tetra(tridecyl)-1,1,3-tris(2-methyl-5-t-butyl-4-hydroxyphenyl)butane diphosphite, tetra(tridecyl)-4,4'-butylidenebis(3-methyl-6-t-butylphenyl) diphosphite, tetra (mixed C1 to C15 alkyl)-4,4'-isopropylidenediphenyl diphosphite, tris(mixed mono- and di-nonylphenyl) phosphite, 4,4'-isopropylidenebis(2-t-butylphenyl) di(nonylphenyl) phosphite, 9,10-di-hydro-9-oxa-9-oxa-10-phosphaphenanthrene 10-oxide, tris(3,5-di-t-butyl-4-hydroxyphenyl) phosphite, hydrogenated 4,4'-isopropylidenediphenyl polyphosphite, bis(octylphenyl)-bis(4,4'-butylidenebis(3-methyl-6-t-butylphenyl)) 1,6-hexanol diphosphite, hexatridecyl-1,1,3-tris(2-methyl-4-hydroxy-5-t-butylphenyl) diphosphite, tris(4,4'-isopropylidenebis(2-t-butylphenyl)) phosphite, tris(1,3-stearoyloxyisopropyl) phosphite, 2,2-methylenebis(4,6-di-t-butylphenyl)octyl phosphite, 2,2-methylenebis(3-methyl-4,6-di-t-butylphenyl) 2-ethylhexyl phosphite, tetrakis(2,4-di-t-butyl-5-methylphenyl)-4,4'-biphenylene diphosphite, and tetrakis (2,4-di-t-butylphenyl)-4,4'-biphenylene diphosphite.

The phosphite-based compound is also exemplified by, but again not specifically limited to, pentaerythritol-type phosphite compound. The pentaerythritol-type phosphite compound is exemplified by 2,6-di-t-butyl-4-methylphenyl-pentaerythritol diphosphite, 2,6-di-t-butyl-4-methylphenyl-methyl-pentaerythritol diphosphite, 2,6-di-t-butyl-4-methylphenyl-2-ethylhexyl-pentaerythritol diphosphite, 2,6-di-t-butyl-4-methylphenyl-isodecyl-pentaerythritol diphosphite, 2,6-di-t-butyl-4-methylphenyl-lauryl-pentaerythritol diphosphite, 2,6-di-t-butyl-4-methylphenyl-isotridecyl-pentaerythritol diphosphite, 2,6-di-t-butyl-4-methylphenyl-stearyl-pentaerythritol diphosphite, 2,6-di-t-butyl-4-methylphenylcyclohexylpentaerythritol diphosphite, 2,6-di-t-butyl-4-methylphenyl-benzyl-pentaerythritol diphosphite, 2,6-di-t-butyl-4-methylphenyl-ethyl cellosolve-pentaerythritol diphosphite, 2,6-di-t-butyl-4-methylphenyl-butylcarbitol-pentaerythritol diphosphite, 2,6-di-t-butyl-4-methylphenyl-octylphenyl-pentaerythritol diphosphite, 2,6-di-t-butyl-4-methylphenyl-nonylphenyl-pentaerythritol diphosphite, bis(2,6-di-t-butyl-4-methylphenyl)pentaerythritol diphosphite, bis(2,6-di-t-butyl-4-ethylphenyl)pentaerythritol diphosphite, 2,6-di-t-butyl-4-methylphenyl-2,6-di-t-butylphenyl-pentaerythritol diphosphite, 2,6-di-t-butyl-4-methylphenyl-2,4-di-t-butylphenyl-pentaerythritol diphosphite, 2,6-di-t-butyl-4-methylphenyl-2,4-di-t-octylphenyl-pentaerythritol diphosphite, 2,6-di-t-butyl-4-methylphenyl-2-cyclohexylphenyl-pentaerythritol diphosphite, 2,6-di-t-amyl-4-methylphenyl-phenyl-pentaerythritol diphosphite, bis(2,6-di-t-amyl-4-methylphenyl)pentaerythritol diphosphite, and bis(2,6-di-t-octyl-4-methylphenyl)pentaerythritol diphosphite.

As the pentaerythritol-type phosphite compound, preferable are bis(2,6-di-t-butyl-4-methylphenyl)pentaerythritol diphosphite, bis(2,6-di-t-butyl-4-ethylphenyl)pentaerythritol diphosphite, bis(2,6-di-t-amyl-4-methylphenyl)pentaerythritol diphosphite, and bis(2,6-di-t-octyl-4-methylphenyl)pentaerythritol diphosphite. Bis(2,6-di-t-butyl-4-methylphenyl)pentaerythritol diphosphite is more preferable.

The hindered amine-based compound is exemplified by, but not specifically limited to, 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl) carbonate, bis(2,2,6,6-tetramethyl-4-piperidyl) oxalate, bis(2,2,6,6-tetramethyl-4-piperidyl) malonate, bis(2,2,6,6-tetramethyl-4-piperidyl) sebacate, bis(2,2,6,6-tetramethyl-4-piperidyl) adipate, bis(2,2,6,6-tetramethyl-4-piperidyl) terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyltolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]-2,2,6,6-tetramethylpiperidine, and condensate of 1,2,3,4-butane tetracarboxylic acid and 1,2,2,6,6-pentamethyl-4-piperidinol and β,β,β',β'-tetramethyl-3,9-[2,4,8,10-tetraoxaspiro [5.5]undecane]diethanol.

The triazine-based compound is exemplified by, but not specifically limited to, hydroxyphenyltriazines.

The hydroxyphenyltriazines are exemplified by 2,4,6-tris (2'-hydroxy-4'-octyloxyphenyl)-1,3,5-triazine, 2-(2'-hydroxy-4'-hexyloxyphenyl)-4,6-diphenyl-1,3,5-triazine, 2-(2'-hydroxy-4'-octyloxyphenyl)-4,6-bis(2',4'-dimethylphenyl)-1,3,5-triazine, 2-(2',4'-dihydroxyphenyl)-4,6-bis(2',4'-dimethylphenyl)-1,3,5-triazine, 2,4-bis(2'-hydroxy-4'-propyloxyphenyl)-6-(2',4'-dimethylphenyl)-1,3,5-triazine, 2-(2-hydroxy-4-octyloxyphenyl)-4,6-bis(4'-methylphenyl)-1,3,5-triazine, 2-(2'-hydroxy-4'-dodecyloxyphenyl)-4,6-bis(2',4'-dimethylphenyl)-1,3,5-triazine, 2,4,6-tris(2'-hydroxy-4'-isopropyloxyphenyl)-1,3,5-triazine, 2,4,6-tris(2'-hydroxy-4'-n-hexyloxyphenyl)-1,3,5-triazine, and 2,4,6-tris (2'-hydroxy-4'-ethoxycarbonylmethoxyphenyl)-1,3,5-triazine.

The sulfur-containing compound is exemplified by, but not specifically limited to, pentaerythrityl tetrakis(3-laurylthiopropionate), dilauryl-3,3'-thiodipropionate, dimyristyl-3,3'-thiodipropionate, and distearyl-3,3'-thiodipropionate.

The inorganic heat stabilizer is exemplified by metal hydroxides which are exemplified by magnesium hydroxide, calcium hydroxide and antimony trioxide. From the viewpoint of further improving the platability, magnesium hydroxide and calcium hydroxide are preferable. In particular, when the LDS additive is an acidic substance, an alkali added thereto as an inorganic heat stabilizer can also serve as an alkali component described later for making the hue of the LDS additive uniform. In some cases, this sort of alkali can also serve as a heat stabilizer.

The content of the heat stabilizer is preferably 0.01 parts by weight to 5 parts by weight, per 100 parts by weight of the resin composition of this invention, which is more preferably 0.03 to 4 parts by weight. Too less heat stabilizer would result in an insufficient effect of heat stabilization, meanwhile too much heat stabilizer would degrade the economy.

«Light Stabilizer»

The resin composition of this invention preferably contains an organic and/or inorganic light stabilizer, and more preferably contains an organic light stabilizer.

The organic light stabilizer is exemplified by UV-absorbing compounds such as benzophenone-based compound, salicylate-based compound, benzotriazole-based compound, and cyanoacrylate-based compound; and radical-scavenging compounds such as hindered amine-based compound and hindered phenol-based compound.

The light stabilizer, based on combined use of the UV-absorbing compound and the radical-scavenging compound, will advantageously demonstrate a stronger effect of stabilization.

Only one species of the light stabilizer may be used, or two or more species may be combined.

The benzophenone-based compound is exemplified by, but not specifically limited to, 2-hydroxy-4-n-octoxybenzophenone, 2,2'-dihydroxy-4-methoxybenzophenone, 2,2'-dihydroxy-4,4'-dimethoxybenzophenone, 2,2',4,4'-tetrahydroxybenzophenone, 2-hydroxy-4-methoxybenzophenone, 2,4-dihydroxybenzophenone, and 2-hydroxy-4-octyloxybenzophenone.

The salicylate-based compound is exemplified by, but not specifically limited to, phenyl salicylate, p-t-butylphenyl salicylate, and p-octylphenyl salicylate.

The benzotriazole-based compound is exemplified by, but not specifically limited to, 2-(2'-hydroxy-5'-methylphenyl) benzotriazole, 2-(3-t-butyl-5-methyl-2-hydroxyphenyl)-5-chlorobenzotriazole, 2-(2'-hydroxy-3',5'-di-t-butylphenyl) benzotriazole, 2-(2'-hydroxy-5'-t-octylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-aminophenyl)benzotriazole, 2-{2'-hydroxy-3'-(3",4",5",6"- tetrahydrophthalimidomethyl)-5'-m ethylphenyl}benzotriazole, 2,2-methylenebis{4-(1,1,3,3-tetramethylbutyl)-6-(2H-benzotriazole-2-yl)phenol}, and 6-(2-benzotriazolyl)-4-t-octyl-6'-t-butyl-4'-methyl-2,2'-methylenebisphenol.

The cyanoacrylate-based compound is exemplified by, but not specifically limited to, 2-ethylhexyl-2-cyano-3,3'-diphenyl acrylate, and ethyl-2-cyano-3,3'-diphenyl acrylate.

The hindered amine-based compound is exemplified by, but not specifically limited to, bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)-n-butyl-3,5-di-t-butyl-4-hydroxybenzyl malonate, condensate of 1-(2-hydroxyethyl)-2,2,6,6-tetramethyl-4-hydroxypiperidine and succinic acid, straight-chain or cyclic condensate of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-t-butylbenzyl) malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, N,N'-bis(2,2,6,6-tetramethyl-4-piperidinyl)-1,3-benzenedicarboxyamide, straight-chain or cyclic condensate of N,N'-bis(2,2,6,6-tetramethyl-4-piperidyl)-hexamethylenediamine and 4-morpholino-2,6-dichloro-1,3,5-triazine, condensate of 2-chloro-4,6-bis(4-n-butylamino-2,2,6,6-tetramethylpiperidyl)-1,3,5-triazine and 1,2-bis(3-aminopropylamino)ethane, condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-di one, 3-dodecyl-1-(1,2,2,6,6-pentamethyl-4-piperidyl)pyrrolidine-2,5-dione, mixture of 4-hexadecyloxy- and 4-stearyloxy-2,2,6,6-tetramethylpiperidines, condensate of N,N'-bis(2,2,6,6-tetramethyl-4-piperidyl)hexamethylenediamine and 4-cyclohexylamino-2,6-dichloro-1,3,5-triazine, condensate of 1,2-bis(3-aminopropylamino)ethane and 2,4,6-trichloro-1,3,5-triazine as well as 4-butylamino-2,2,6,6-tetramethylpiperidine (CAS. No. [136504-96-6]); condensates of 1,6-hexanediamine and 2,4,6-trichloro-1,3,5-triazine, as well as N,N-dibutylamine and 4-butylamino-2,2,6,6-tetramethylpiperidine (CAS. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4.5]decane, reaction product of 7,7,9,9-tetramethyl-2-cycloundecyl-1-oxa-3,8-diaza-4-oxo-spiro[4.5]decane and epichlorohydrin, 1,1-bis(1,2,2,6,6-pentamethyl-4-piperidyloxycarbonyl)-2-(4-meth oxyphenyl)ethene, N,N'-bis-formyl-N,N'-bis(2,2,6,6-tetramethyl-4-piperidyl)hexamethylenediamine, diester of 4-methoxymethylenemalonic acid and 1,2,2,6,6-pentamethyl-4-hydroxypiperidine, poly[methylpropyl-3-oxy-4-(2,2,6,6-tetramethyl-4-piperidyl)]siloxane, reaction product of maleic anhydride-α-olefin copolymer and 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (from Clariant); CAS. No. [106917-31-1]), 5-(2-ethylhexanoyl)oxymethyl-3,3,5-trimethyl-2-morpholinone, reaction product of 2,4-bis[(1-cyclohexyloxy-2,2,6,6-piperidine-4-yl)butylamino]-6-chloro-s-triazine and N,N'-bis(3-aminopropyl) ethylenediamine), 1,3,5-tris(N-cyclohexyl-N-(2,2,6,6-tetramethylpiperidine-3-one-4-yl)amino)-s-triazine, 1,3,5-tris(N-cyclohexyl-N-(1,2,2,6,6-pentamethylpiperazine-3-one-4-yl)amino)-s-triazine, N,N',N'',N'''-tetrakis-(4,6-bis-(butyl-(N-methyl-2,2,6,6-tetramethylpiperidine-4-yl) amino)-triazine-2-yl)-4,7-diazadecane-1,10-diamine, and poly[[6-(1,1,3,3-tetramethylbutyl)amino-1,3,5-triazine-2,4-diyl] [(2,2,6,6-tetramethyl-4-piperidyl)imino]hexamethylene{(2,2,6,6-tetramethyl-4-piperidyl)imino}]. Among them, preferably exemplified are bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, N,N'-bis(2,2,6,6-tetramethyl-4-piperidinyl)-1,3-benzenedicarboxyamide, and N,N',N'',N'''-tetrakis(4,6-bis(butyl-(N-methyl-2,2,6,6-tetramethylpiperidine-4-yl) amino)-triazine-2-yl)-4,7-diazadecane-1,10-diamine.

The hindered phenol-based compound is exemplified by, but not specifically limited to, pentaerythrityl-tetrakis{3-(3,5-di-t-butyl-4-hydroxyphenyl)propionate}, N,N'-hexamethylenebis(3,5-di-t-butyl-4-hydroxy-hydrocinnamamide, triethylene glycol-bis{3-(3-t-butyl-5-methyl-4-hydroxyphenyl)propionate}, 3,9-bis{2-[3-(3-t-butyl-4-hydroxy-5-methylphenyl)propinyloxy]-1,1-dimethylethyl}-2,4,8,10-tetraoxaspiro[5.5]undecane, 3,5-di-t-butyl-4-hydroxy-benzylphosphonate diethyl ester, 1,3,5-trimethyl-2,4,6-tris(3,5-di-t-butyl-4-hydroxybenzyl)benzene, and 1,3,5-tris(4-t-butyl-3-hydroxy-2,6-dimethylbenzyl) isocyanate.

The content of the light stabilizer is preferably 0.01 parts by weight to 5 parts by weight, per 100 parts by weight of the resin composition of this invention, which is more preferably 0.01 to 4 parts by weight.

«Alkali»

The resin composition of this invention may contain an alkali. An acidic substance (for example, pH6 or lower), when used as the LDS additive in this invention, would occasionally be reduced to cause spotted hue. In contrast, addition of the alkali will make the hue of the obtainable resin molding more uniform. Employable alkali includes calcium hydroxide and magnesium hydroxide, without special limitation. Only one species of alkali may be used, or two or more species may be combined.

Although depending on the types of LDS additive and the types of alkali, the addition amount of alkali in the resin composition of this invention is preferably 0.01 to 20% by weight of the addition amount of LDS additive, and is more preferably 0.05 to 15% by weight.

<Method for Preparing Resin Composition>

Method for preparing the resin composition of this invention is a matter of free choice.

According to one exemplary method, a thermoplastic resin, an inorganic filler, an LDS additive and so forth are mixed using a mixing means such as a V-type blender to prepare an all-in-one blend, the blend is then melt-kneaded and pelletized using a vented extruder. According to another exemplary method known as two-stage kneading, all components excluding the inorganic filler are preliminarily mixed thoroughly, then melt-kneaded and pelletized using a vented extruder, the obtained pellets are mixed with the inorganic filler, and the mixture is melt-kneaded using a vented extruder.

According to still another method, all components excluding the inorganic filler are preliminarily mixed thoroughly using a V-type blender or the like, the preparation is fed through a first chute of a vented twin screw extruder, and the inorganic filler is fed through a second chute in the middle of the extruder, for melt-kneading and pelletizing.

In a preferred arrangement of screws in the kneading zone of the extruder, a kneading-promoting element is placed on the upstream side, and a pressurizing element is placed on the downstream side.

The kneading-promoting element is exemplified by forward kneading disk element, cross kneading disk element, wide kneading disk element, and forward mixing screw element.

Heating temperature during melt-kneading may suitably be selected, typically within the range from 180 to 360° C. Too high temperature would make the composition more likely to produce a decomposition gas, which may result in clouding. Hence, a proper choice of screw arrangement which is conscious of shear heating is preferred. Use of an antioxidant and heat stabilizer is recommendable in order to suppress the decomposition during kneading and post-processes.

<Resin Molding>

This invention also discloses a resin molding obtainable by molding the resin composition of this invention.

Method for manufacturing a resin molding may freely be selectable from commonly used methods without special limitation. Examples of the methods include injection molding, ultrahigh-speed injection molding, injection compression molding, two-color molding, hollow molding such as gas-assisted molding, molding using heat insulating mold, molding using rapid heating mold, foam molding (including supercritical fluid), insert molding, IMC (in-mold coating), extrusion molding, sheet molding, heat molding, rotational molding, lamination molding, press molding, and blow molding. Also molding method based on a hot runner system is employable.

The resin molding obtainable by molding the resin composition of this invention is advantageously used as a plated resin molding that has a plating on the surface thereof. The plating layer on the resin molding of this invention is preferably embodied so that it can perform as an antenna.

<Method for Manufacturing Plated Resin Molding>

Next paragraphs will disclose a method for manufacturing a plated resin molding, which includes a step of forming a plating by irradiating laser on the surface of a resin molding obtainable by molding the resin composition of this invention, and then applying a metal.

The FIGURE is a schematic drawing illustrating a step of forming a plating on the surface of a resin molding 1, based on the laser direct structuring technique. Note that the resin molding 1, illustrated to be a flat substrate in the FIGURE, is not always necessarily be flat, but instead may be a resin molding that is partially or entirely curved. The obtainable plated resin molding is not limited to a final product, but may be any of various parts.

Referring now back to the FIGURE, the resin molding 1 is irradiated with laser 2. The laser in this case may suitably be selected from known lasers such as YAG laser, excimer laser, and electromagnetic radiation, without special limitation. YAG laser is preferable. Also the wavelength of laser is not specifically limited. The wavelength is preferably 200 nm to 1200 nm, and particularly 800 to 1200 nm.

Upon being irradiated with laser, the resin molding 1 is activated only in a laser-irradiated area 3. The resin molding 1 thus activated is then exposed to a plating solution 4. The plating solution 4 is selectable from a wide variety of known plating solutions without special limitation, which is preferably a plating solution (in particular, electroless plating solution) whose metal component is composed of at least one of copper, nickel, silver, gold, or palladium; more preferably a plating solution (in particular, electroless plating solution) that contains at least one species selected from copper, nickel, silver and gold; and even more preferably a plating solution (in particular, electroless plating solution) that contains copper. In short, the metal component of the plating in this invention is preferably composed of at least one species selected from the metals described above.

Method of exposing the resin molding 1 to the plating solution 4 is exemplified, but again not specifically limited to, a method by which the resin molding 1 is placed in a liquid which is a blend of plating solution. The resin molding after being exposed to the plating solution will have a plating 5 formed only in the laser-irradiated area.

According to the method of this invention, a wide of 1 mm wide or narrower, and even 150 μm or narrower (the lower limit is for example, but not specifically limited to, 30 μm or above) may be formed. In order to prevent corrosion or degradation of the thus formed circuit, the electroless plating may be followed by electroplating so as to protect the plating with nickel, gold or the like. Alternatively, the electroless plating may be followed by electroplating in the same way, to thereby obtain a necessary thickness within a short time.

The method for manufacturing the plated resin molding is preferably employed as a method for manufacturing an antenna-equipped portable electronic device part, which includes the method for manufacturing the plated resin molding.

The molding obtainable from the resin composition of this invention may be used for various applications including electronic parts (in particular, portable electronic device parts) such as connector, switch, relay and conductive circuit; reflecting plate such as lamp reflector; sliding components such as gear and cam; automotive parts such as air intake manifold; utility parts such as sink; and various decoration parts; as well as film, sheet or fiber.

The resin composition of this invention has a high level of flame retardant, rated as V-0 by the UL 94 test for a thickness of 1.5 mm.

For other aspects, references may be made to the descriptions of JP-A-2011-219620, JP-A-2011-195820, JP-A-2011-178873, JP-A-2011-168705 and JP-A-2011-148267, without departing from the spirit of this invention.

EXAMPLES

This invention will further be detailed referring to Examples. All materials, amounts of consumption, ratios, process details and procedures described in Examples below may suitably be modified, without departing from the spirit of this invention. Hence, the scope of this invention is by no means limited to specific Examples below.

Parent Materials

Parent materials listed below were used.

<Synthesis of Polyamide Resin PXD10>

Into a 50-liter (internal volume) reactor equipped with a stirrer, a partial condenser, a cooler, a thermometer, a dropping device, a nitrogen feeding tube and a strand die, placed were 8950 g (44.25 mol) of sebacic acid (TA, from Itoh Oil Chemicals Co., Ltd.), 12.54 g (0.074 mol) of calcium hypophosphite, and 6.45 g (0.079 mol) of sodium acetate, all being precisely weighed. The inside of the reactor was thoroughly replaced with nitrogen gas, pressurized with nitrogen gas up to 0.4 MPa, the content was heated from 20° C. to 190° C. under stirring, to thereby uniformly melt sebacic acid over 55 minutes. Next, 5960 g (43.76 mol) of paraxylylenediamine (from Mitsubishi Gas Chemical Company Inc.) was added dropwise under stirring over 110 minutes. During the process, the internal temperature was continuously elevated up to 293° C. During the dropwise addition, the pressure was controlled to 0.42 MPa, while eliminating the generated water through the partial condenser and the cooler out of the system. Temperature of the partial condenser was controlled within the range from 145 to 147° C. After the dropwise addition of paraxylylenediamine, polycondensation was allowed to continue for 20 minutes, while keeping the internal pressure of reactor at 0.42 MPa. During the process, the internal temperature of reactor was elevated up to 296° C. The internal pressure of reactor was then reduced from 0.42 MPa to 0.12 MPa over 30 minutes. During the process, the internal temperature was elevated up to 298° C. The pressure was then reduced at a rate of 0.002 MPa/min, down to 0.08 MPa over 20 minutes, to thereby control the content of a component having a molecular weight of 1,000 or smaller. The internal temperature of reactor, upon completion of the pressure reduction, was 301° C. The system was then pressurized with nitrogen gas, the polymer was taken out in the form of strands through the strand die at an internal reactor temperature of 301° C., and a resin temperature of 301° C., the strands were cooled in cooling water at 20° C., and pelletized, to obtain approximately 13 kg of polyamide resin. The cooling time in cooling water was set to 5 seconds, and the take-up speed of strand was set to 100 m/min. The polyamide resin will be referred to as "PXD10". The melting point was found to be 290° C.

<Synthesis of Polyamide Resin MP6>

Adipic acid (from Rhodia S.A.) was allowed to melt under heating in a reaction can under a nitrogen atmosphere, the content was kept stirred, and a mixed diamine with a molar ratio of paraxylylene diamine (from Mitsubishi Gas Chemical Company Inc.) and metaxylylene diamine of 4:6 was added dropwise so as to adjust the molar ratio of diamine and dicarboxylic acid to 1:1, during which the temperature was elevated. Upon completion of the dropwise addition, the reaction was allowed to continue under stirring until a predetermined viscosity was achieved, the content was taken out in the form of strands, pelletized using a pelletizer, to thereby obtain a polyamide resin (MP6). The melting point was found to be 254° C.

PA66: polyamide 66, Zytel 101NC-10 from DuPont, melting point=265° C.

TABLE 1

| Material | Details | Manufacturer | Trade Name |
|---|---|---|---|
| LDS Additive | SnO 80 wt % $Sb_2O_5$ 20 wt % | Mitsubishi Materials Corporation | T1-20L |
| | SnO 95 wt % $Sb_2O_5$ 5 wt % | Keeling & Walker Limited | CP5C |
| | SnO 90 wt % $Sb_2O_5$ 10 wt % | Mitsubishi Materials Corporation | T1 |
| | ZnO 98 wt % $Al_2O_3$ 2 wt % | HakusuiTech Co., Ltd. | 23K |
| | $CuCr_2O_4$ | The Shepherd Color Company | Black1G |
| Metal Oxides | $SnO_2$ | Mitsubishi Materials Corporation | S1 |
| Inorganic Filler | Glass Fiber (E Glass) | Nippon Electric Glass Co., Ltd. | T-756H |
| Flame Retardant | Brominated Polystyrene Resin | Albemarle Corporation, | HP3010 |
| | Ethylene-bis(pentabromophenyl) | Albemarle Corporation, | SAYTEX8010 |
| Flame Retardant Auxiliary | $Sb_2O_3$ | Nihon Seiko Co., LTD. | PATOX-M |
| Mold Releasing Agent | Calcium montanate | Nitto Kasei Co., Ltd. | CS-8CP |
| Talc | Talc having an average particle diameter of 5 μm | Hayashi Kasei Co., Ltd. | MW5000S |

In Table 1, wt % means % by weight.

Example 1

<Compound>

The individual components were weighed according to the composition summarized in Table 3 below, all components but excluding the inorganic filler were blended using a tumbler, fed from the base of the twin screw extruder (TEM26SS, from Toshiba Machine Co., Ltd.), melted while being fed with the inorganic filler from the side, to thereby manufacture resin pellets. The temperature of the twin screw extruder was set to 300° C.

<Notched Charpy Impact Strength>

Using the ISO tensile test specimen (4 mm thick), notched Charpy impact strength was measured at 23° C. in accordance with ISO 179.

<Flame retardant (UL 94 Test)>

The pellets manufactured by the method described above were dried at 120° C. for 5 hours, and then injection-molded using injection molding machine Model J50-EP from Japan Steel Works, Ltd. at a cylinder temperature of 300° C., and a mold temperature of 130° C., to thereby form a UL 94 test specimen of 125 mm long, 13 mm wide, and 1.5 mm thick on average.

Flame retardant of the thus obtained UL 94 test specimen was determined in accordance with the UL 94 test (Tests for Flammability of Plastic Materials for Parts in Devices and Appliances) released by Underwriters Laboratories of the United States (UL), after moisture-conditioned in a thermostat chamber at 23° C. and 50% humidity. The UL 94 test is a method for evaluating flame retardant, based on the after flame time and dripping tendency shown by an prescribedsized test specimen that was held perpendicularly and exposed to flame of a burner for 10 seconds. The criteria that need to be satisfied for V-0, V-1 and V-2 ratings for flame retardant are summarized below.

TABLE 2

|  | V-0 | V-1 | V-2 |
|---|---|---|---|
| Burning Time of Each Individual Test Specimens | ≤10 sec | ≤30 sec | ≤30 sec |
| Total Burning Time of 5 flame Applications | ≤50 sec | ≤250 sec | ≤250 sec |
| Cotton ignition by drip | no | no | yes |

Now the "after flame time" is the length of time over which the test specimen remains in flaming after the ignition source was brought away. The "cotton ignition by drip" is determined whether a cotton as an indicator placed approximately 300 mm below the lower end of the test specimen is ignited or not by dripping from the test specimen. If there were even one specimen, out of five test specimens, that did not satisfy the above-listed criteria, the material was judged to be NR (not rated), meaning that V-2 was not satisfied.

<Platability (LDS Activity)—Plating Index>

The pellets manufactured by the method described above were dried at 120° C. for 5 hours, and then injection-molded using injection molding machine Model SG75-MII from Nissei Plastic Industrial Co., Ltd., at a cylinder temperature of 300° C., a mold temperature of 130° C., and a molding cycle of 50 seconds, to thereby form a plate of 3 mm thick.

The thus obtained 3 mm thick plate was marked by irradiating it with a 1064-nm YAG laser, under various conditions based on combinations of the output ranging from 2.6 to 13 W, the scanning speed ranging from 1 to 2 m/s, and the frequency ranging from 10 to 50 µs, the specimen was then degreased with sulfuric acid, treated with THP Alkaliacti and THP Alkaliacce from Kizai Corporation, and plated in SEL Copper from Kizai Corporation. The specimen after the plating was visually observed, and classified according to a three-stage rating as below:

A: good appearance, full coverage with plating;
B: practically acceptable level, despite partial coverage with plating; and
C: practically unacceptable level, with no coverage or partial coverage with plating.

Examples 2 to 9, and Comparative Examples 1 to 7

Syntheses were conducted in the same way as in Example 1, except that the amounts of consumption of the individual components were altered as summarized in Table 3 and Table 4, that the cylinder temperature was changed to 280° C. for the case where MP6 or PA66 was used as the resin, and that the mold temperature was changed to 80° C. for the case where PA66 was used.

TABLE 3

| Material | Trade Name etc. | Example 1 | Example 2 | Example 3 | Example 4 | Example 5 | Example 6 | Example 7 | Example 8 | Example 9 |
|---|---|---|---|---|---|---|---|---|---|---|
| Resin | PXD10 | 100 | 100 | 100 | 100 | 100 | 100 | | | |
| | MP6 | | | | | | | 100 | | 100 |
| | PA66 | | | | | | | | 100 | |
| LDS Additive | T1-20L | 11 | | | | 11 | 5 | 11 | 11 | |
| | CP5C | | 11 | | 25 | | | | | 21 |
| | T1 | | | 11 | | | | | | |
| | 23K | | | | | | | | | |
| | Black1G | | | | | | | | | |
| Metal Oxides | S1 | | | | | | | | | |
| Inorganic Filler | T-756H | 67 | 67 | 67 | 76 | 67 | 67 | 67 | 67 | 62 |
| Flame Retarder | HP3010 | 34 | 34 | 34 | 38 | | 34 | 34 | 34 | 12 |
| | SAYTEX8010 | | | | | 34 | | | | |
| Flame Retardant Auxiliary | PATOX-M | | | | | | | | | |
| Mold Releasing Agent | CS-8CP | 1 | 1 | 1 | 1 | 1 | 1 | 1 | 1 | 1 |
| Talc | MW5000S | 11 | 11 | 11 | 13 | 11 | 11 | 11 | 11 | 10 |
| Content of Antimony in Resin Composition | | 0.75 | 0.19 | 0.38 | 0.38 | 0.76 | 0.35 | 0.76 | 0.76 | 0.38 |
| Ratio by Weight of LDS Additive/Flame Retardant | | 0.33 | 0.33 | 0.33 | 0.67 | 0.33 | 0.15 | 0.33 | 0.33 | 1.75 |
| Notched Charpy Impact Strength ( kJ/m$^2$) | | 10.6 | 4.4 | 10.0 | 9.5 | 10.1 | 11.7 | 10.8 | 9.0 | 4.2 |
| UL-94Evaluation | Total Burning Time (Sec) | 15 | 103 | 32 | 25 | 17 | 35 | 5 | 41 | 21 |
| | Burning Time (Sec) | 3 | 27 | 7 | 6 | 3 | 8 | 2 | 8 | 5 |
| | Classification | V-0 | V-1 | V-0 | V-0 | V-0 | V-0 | V-0 | V-0 | V-0 |
| | Platability | A | A | A | A | A | B | A | A | A |

TABLE 4

| Material | Trade Name etc. | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Resin | PXD10 | 100 | 100 | 100 | 100 | 100 | 100 | 100 |
|  | MP6 |  |  |  |  |  |  |  |
|  | PA66 |  |  |  |  |  |  |  |
| LDS Additive | T1-20L |  |  |  |  |  |  | 11 |
|  | CP5C |  |  |  |  |  |  |  |
|  | T1 |  |  |  |  |  |  |  |
|  | 23K |  | 11 |  |  |  |  |  |
|  | Black1G | 11 |  | 13 |  |  |  |  |
| Metal Oxides | S1 |  |  |  | 11 | 9 |  |  |
| Inorganic Filler | T-756H | 67 | 67 | 76 | 67 | 67 | 67 | 67 |
| Flame Retarder | HP3010 | 34 | 34 | 38 | 34 | 34 | 34 | 34 |
|  | SAYTEX8010 |  |  |  |  |  |  |  |
| Flame Retardant Auxiliary | PATOX-M |  |  | 13 |  | 2 | 11 | 2 |
| Mold Releasing Agent | CS-8CP | 1 | 1 | 1 | 1 | 1 | 1 | 1 |
| Talc | MW5000S | 11 | 11 | 13 | 11 | 11 | 11 | 11 |
| Content of Antimony in Resin Composition |  | 0.00 | 0.00 | 4.18 | 0.00 | 0.84 | 4.18 | 1.50 |
| Ratio by Weight of LDS Additive/Flame Retardant |  | 0.33 | 0.33 | 0.33 | 0.00 | 0.00 | 0.00 | 0.33 |
| Notched Charpy Impact Strength (kJ/m$^2$) |  | 4.6 | 8.7 | 4.8 | 7.4 | 7.8 | 7.5 | 9.8 |
| UL-94Evaluation | Total Burning Time (Sec) | 224 | 152 | 4 | 112 | 43 | 4 | 10 |
|  | Burning Time (Sec) | 42 | 34 | 1 | 31 | 7 | 1 | 3 |
|  | Classification | N R | N R | V-0 | N R | V-0 | V-0 | V-0 |
|  | Platability | A | A | C | C | C | C | C |

As clearly known from Table 3 and Table 4 above, the composition of this invention was found to have high levels of flame retardant and platability. In particular, with the antimony content in the composition controlled to the predetermined level or above, and with the ratio by weight of the LDS additive and the flame retarder (LDS additive/flame retarder) controlled to the predetermined level or above, it now became possible to balance the flame retardant and the platability at higher levels.

In contrast, the resins that contain the halogen-containing flame retarder but the LDS additive does not contain antimony (Comparative Examples 1, 2 and 4) were found to show poor flame retardant. Meanwhile, the resins that contain antimony-free LDS additives, and contain antimony-containing flame retarder auxiliary (Comparative Examples 3, 5, 6) were found to achieve V-0 rating of flame retardant, but found to degrade the platability. On the other hand, the resin that contains the antimony-containing LDS additive, as well as the antimony-containing flame retarder auxiliary, was found to show good flame retardant, but poor platability (Comparative Example 7).

REFERENCE SIGNS LIST 1 resin molding
2 laser
3 laser-irradiated area
4 plating solution
5 plating

What is claimed is:

1. A resin composition comprising:
100 parts by weight of a thermoplastic resin;
5 to 100 parts by weight of a halogen-containing flame retarder; and,
1 to 30 parts by weight of a laser direct structuring additive,
wherein the laser direct structuring additive contains antimony and tin, with a content of tin larger than a content of antimony, and;
a content of an antimony-containing flame retarder auxiliary is 0.5 parts by weight or less per 100 parts by weight of the thermoplastic resin,
wherein the antimony-containing flame retarder auxiliary is an antimony oxide, sodium antimonite, or antimony phosphate.

2. The resin composition of claim 1, further comprising 10 to 150 parts by weight of an inorganic filler per 100 parts by weight of the thermoplastic resin.

3. The resin composition of claim 2, wherein the inorganic filler is a glass fiber.

4. The resin composition of claim 1, wherein a content of antimony in the resin composition is 0.1% by weight or more.

5. The resin composition of claim 1, wherein the thermoplastic resin is a polyamide resin.

6. The resin composition of claim 1, wherein the laser direct structuring additive contains at least one of antimony oxide and tin oxide.

7. The resin composition of claim 1, wherein the halogen-containing flame retarder contains a brominated polystyrene resin.

8. The resin composition of claim 1, which satisfies V-0 in UL 94 test, when the resin composition is formed into a resin molding with an average thickness of 1.5 mm.

9. A resin molding, obtainable by molding the resin composition described in claim 1.

10. The resin molding of claim 9, having a plating on a surface thereof.

11. The resin molding of claim 10, wherein the plating serves as an antenna.

12. The resin molding of claim 9, which is a portable electronic device part.

13. A method for manufacturing a plated resin molding comprising forming a plating by irradiating laser on a surface of a resin molding obtainable by molding the resin composition described in claim 1, and then by applying a metal.

14. The method for manufacturing a plated resin molding of claim 13, wherein the plating is a copper plating.

15. A method for manufacturing an antenna-equipped portable electronic device part, comprising the method for manufacturing a plated resin molding described in claim 13.

16. The resin composition of claim 1, wherein the laser direct structuring additive is a compound that can form a plating layer on a laser-irradiated surface.

17. The resin composition of claim 1, wherein the laser direct structuring additive and the antimony-containing flame retarder auxiliary are not the same.

* * * * *